United States Patent [19]
Perelshteyn

[11] Patent Number: 5,458,005
[45] Date of Patent: Oct. 17, 1995

[54] FLUID MASS FLOW METERS

[75] Inventor: Mark Perelshteyn, Vineland, N.J.

[73] Assignee: ABBK-Flow Inc., Millville, N.J.

[21] Appl. No.: 91,938

[22] Filed: Jul. 15, 1993

[30] Foreign Application Priority Data

Jul. 15, 1992 [GB] United Kingdom ............... 9215043

[51] Int. Cl.⁶ .................. G01F 1/32; G01F 1/20; G01F 1/84
[52] U.S. Cl. .................. 73/861.34; 73/861.18; 73/861.38
[58] Field of Search .................. 73/861.18, 861.19, 73/861.21, 861.37, 861.38, 861.34

[56] References Cited

U.S. PATENT DOCUMENTS

| | | | |
|---|---|---|---|
| 4,420,983 | 12/1983 | Langdon | 73/861.18 |
| 4,622,858 | 11/1986 | Mizerak | 73/861.38 |
| 4,776,222 | 10/1988 | Lew | |
| 5,226,330 | 7/1993 | Lew | 73/861.37 |

FOREIGN PATENT DOCUMENTS

| | | |
|---|---|---|
| 0263719 | 4/1988 | European Pat. Off. . |
| 2431607 | 1/1976 | Germany . |
| 3816623C1 | 11/1989 | Germany . |
| 2012421 | 7/1979 | United Kingdom . |

Primary Examiner—Richard E. Chilcot, Jr.
Assistant Examiner—William L. Oen
Attorney, Agent, or Firm—Seidel, Gonda, Lavorgna & Monaco

[57] ABSTRACT

A fluid mass flow meter comprises a swirl generator 16 followed by a convergent nozzle 20 which produce a strongly swirling flow with periodic pressure fluctuations. The flow is subjected to a Coriolis force in a divergent nozzle 26. The pressure fluctuations are sensed by axially-spaced pressure-collecting pipes 32, 32', and a phase shift in the pressure fluctuations between the two pipes due to the Coriolis force is a measure of mass flow.

27 Claims, 2 Drawing Sheets

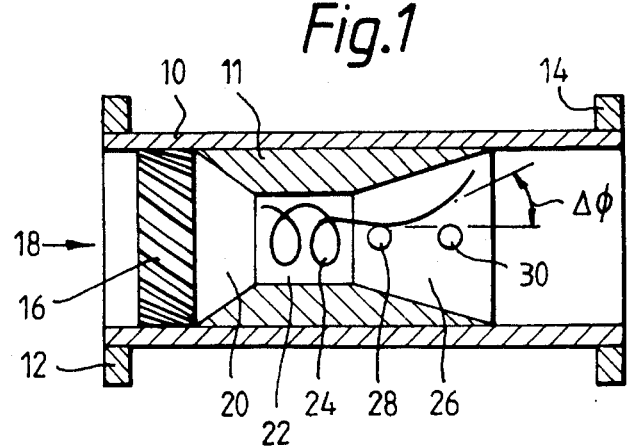
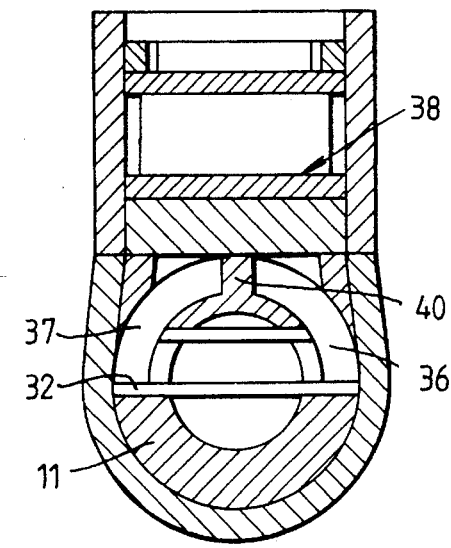
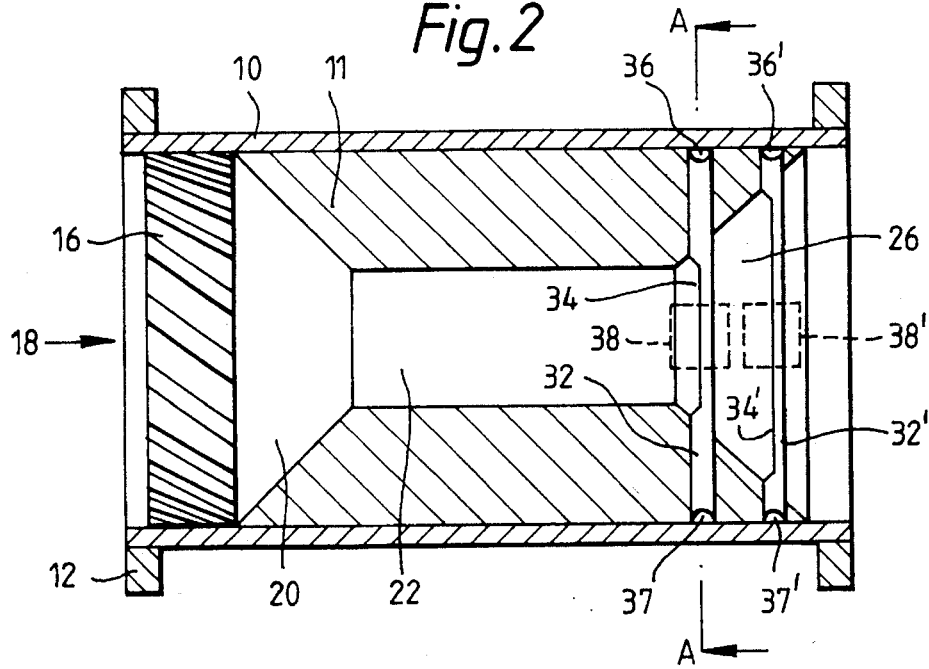

FLUID MASS FLOW METERS

This invention relates to mass flow meters for fluids. The term "fluid" includes both liquids and gases.

Amongst known flow meters in the F & P Swirlmeter which provides an indication of flow velocity by measuring the frequency of pressure fluctuations in the fluid at the centre of the flow. However, no information regarding the mass flow rate of the fluid is obtained, and so this device can only provide an indication of volumetric flow rate.

Other flow meters which are capable of indicating mass flow rate rely upon measurement of the angular momentum of a swirling fluid, and its relationship to torque. This torque is measured from some form of impeller or from the gyroscopic couple developed if the duct through which the fluid flows is itself rotated about a transverse axis. Other mass-flow meters such as that disclosed in U.S. Pat. No. 4,776,222 sense the frequency and amplitude of pressure differentials to which a pivoted or otherwise moveably mounted vane is subjected by trains of vortices shed by a bluff body, the frequency and amplitude respectively being proportional to volume and mass flow rates.

All of these devices have the disadvantage of moving mechanically stressed parts in the flow duct and are also complex. It is an object of this invention to avoid these disadvantages.

Thus the present invention achieves a mass flow meter which has the merits of simplicity and of having no moving parts; it is based on the inducement of a hydrodynamic perturbation and the measurement of a phase shift as the perturbation passes through the device.

By perturbation we mean a disturbance in an established flow pattern. The perturbation may be a once-off (non-recurring) disturbance eg a transient or a step-change, or (as in the preferred embodiments) may be a periodic disturbance.

According to one aspect of the present invention there is provided a method of measuring the mass flow rate of a flowing fluid comprising inducing a perturbation in the fluid flow, subjecting the fluid to a Coriolis force to produce a phase shift in the perturbation which is indicative of the mass flow rate, and measuring the phase shift.

The perturbation may be induced by producing rotation of the fluid around the axial direction of its flow and subjecting the fluid to a Coriolis force by generating a radial velocity component in the fluid flow, for example by means of a duct diverging in the axial direction of the fluid flow.

Preferably the perturbation is a periodic pressure perturbation.

The invention also provides a method of measuring the mass flow rate of a flowing fluid comprising inducing periodic perturbations in the flowing fluid, and measuring a phase shift in said perturbations which is related to the mass flow rate.

In another aspect the invention provides apparatus for measuring the mass flow rate of a flowing fluid comprising means for inducing a perturbation in the fluid flow, means for subjecting the fluid to a Coriolis force and means for measuring a phase shift in the perturbation due to the Coriolis force and which is indicative of the mass flow rate.

The means for inducing a perturbation may comprise means for producing rotation of the fluid around the axial direction of its flow and means for subjecting the fluid to a Coriolis force by generating a radial velocity component in the fluid flow.

Upstream of the diverging duct there may be a swirl generator to produce said rotation and a convergent duct for producing periodic pressure perturbations in the fluid flow.

In a further aspect the invention provides apparatus for measuring the mass flow rate of a flowing fluid comprising means for inducing periodic perturbations in the flowing fluid and means for measuring a phase shift in said perturbations which is indicative of the mass flow rate.

The means for measuring a phase shift may comprise a plurality of pressure measuring stations spaced axially and/or circumferentially of the fluid flow.

There may be two pressure measuring stations are disposed at 90° to each other and are spaced axially of the fluid flow.

A said pressure measuring station may comprise means for sensing pressure fluctuations across a transverse axis of the fluid flow.

Preferably the pressure sensing means comprises a pipe extending transversely across and open to the fluid flow, opposite ends of the pipe being connected separately to pressure transducer means so that the output of the transducer means is indicative of the frequency and phase of the pressure fluctuations.

In its preferred forms, there is no practical limit to the size of the meter, and no lower pressure operating limit. It can operate over a wide range of pressures and temperatures, is less affected by mixed-phase flows than known devices, and can operate with dirty fluids.

The invention will now be described, with reference to the accompanying drawings, wherein:

FIG. 1 illustrates diagrammatically the principle of the invention;

FIG. 2 is a horizontal axial cross-section through one embodiment of a flow meter according to the invention;

FIG. 3 is a section on A—A of FIG. 2;

Figure 4:
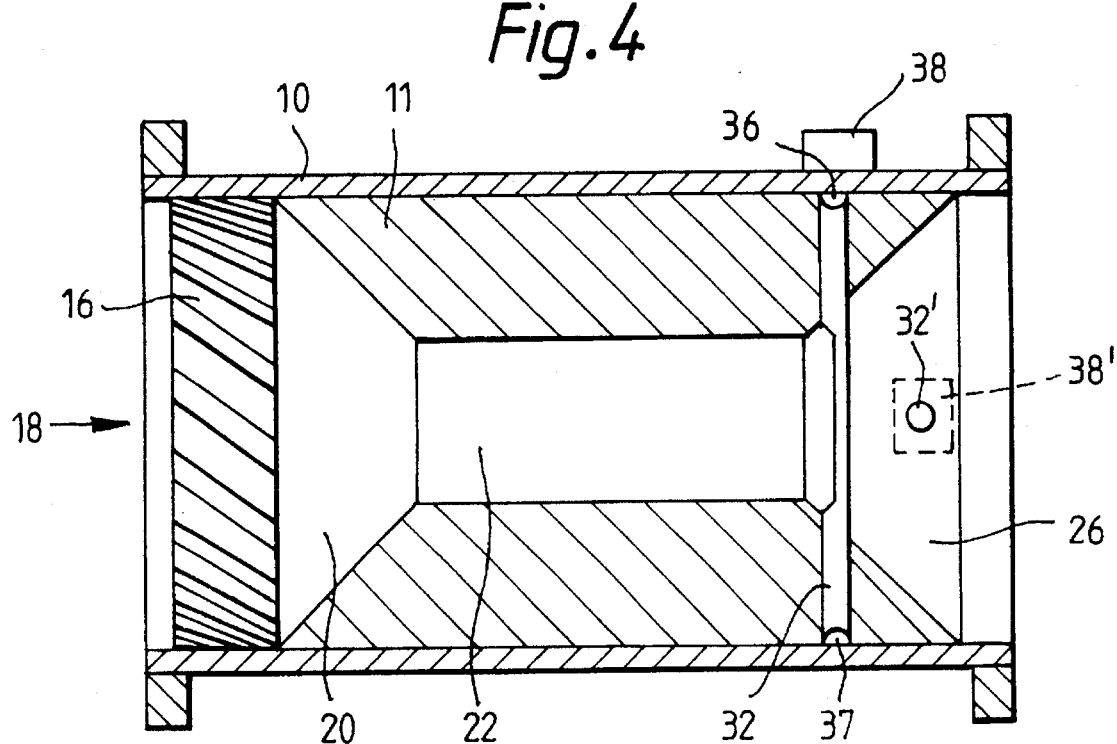
FIG. 4 is an axial cross-section through another embodiment of a flow meter according to the invention.

Referring to FIG. 1 an in-line flow meter comprises a tubular body 10 having flanges 12, 14 for coupling it between upstream and downstream portions of a pipe, through which the mass flow rate of fluid is to be measured.

The flow meter body 10 has an annular insert 11 defining a circular-section flow duct containing at its upstream end a set of angularly spaced-apart radially-extending vanes 16 angled to the direction of flow and thus forming a swirl generator. Fluid entering the duct axially in the direction of arrow 18 has its flow transformed into a strongly three-dimensional rotating flow. A convergent section 20 transforms and enhances the swirl into strong but regular periodic pressure fluctuations.

A parallel section 22 of the duct stabilises the swirling flow (shown symbolically at 24) before it enters a divergent nozzle section 26. In the divergent nozzle the change in flow area produces a radially-outward motion in the fluid which in combination with the rotating swirl, subjects the fluid particles to Coriolis forces thereby displacing them through an angle $\Delta\phi$. This displacement manifests itself as a phase shift in the pressure fluctuations which is measured at two axially-spaced pressure-measuring stations, the axial positions of which are shown at 28, 30, as described below.

A flow meter is shown in more detail in FIGS. 2 and 3. Those parts already mentioned bear the same reference numerals and will not be further described.

The pressure sensor at station 28, comprises a pressure-collecting pipe 32 disposed across the diameter of the diverging duct 26. The upstream-facing side of the pipe is cut away at 34 so as to expose the interior of the pipe to the total (static plus hydrodynamic) fluid pressure. The pipe 32 extends through the annular insert 11 to connect at each end with a respective groove 36, 37 in the outer wall of the insert. Each groove 36, 37 defines with the body 10 a conduit separately communicating with a pressure transducer 38 (FIG. 3). The conduits 36, 37 whilst communicating with a common transducer are separated by a wall 40 so that pressure fluctuations is one conduit are not transmitted to the other.

The pressure at the ends of the pipe 32 (ie. the pressure at the ends of a diameter of the nozzle 26) are added algebraically by the tranducer 38 to provide a pulsed electrical output the frequency of which is equal to the frequency of the pressure fluctuations and proportional to the volume flow rate of the fluid.

The pressure sensor at station 30 is identical to that at station 28, the corresponding features bearing the same reference numerals with the addition of a prime ('). The pipe 32' in this embodiment is parallel to the pipe 32 and downstream thereof but only to the extent necessary for mechanical design considerations.

The pressure fluctuations at the ends of the pipe 32' and the output of the transducer 38' have the same frequency as those of the pipe and transducer 32, 38. There is however a phase difference between them which is produced by and proportional to the deflection $\Delta\phi$ (FIG. 1) of the fluid flow due to the Coriolis force to which it is subjected in the diverging nozzle 26. The greater the mass flow rate, the greater the Coriolis force generated by the radially-outward velocity which the fluid acquires as it swirls through the diverging nozzle. Thus, by comparing the phases of the electrical signals from the transducers 38, 38' by a conventional phase comparator circuit an output is obtained which (subject to calibration) is directly indicative of the mass flow rate. The fluid density can also be obtained from the ratio of the phase shift (mass flow) to frequency (volume flow rate); total volume flow and total mass flow can be obtained by integrating the frequency and phase shift signals.

FIG. 4 shows a modified form of flow meter; features already described have the same reference numerals. In this embodiment the downstream pressure collecting pipe 32' is aligned at 90 ' to the upstream pipe 32. The phase shift, after allowing for the 90° offset is again proportional to mass flow rate, and this embodiment has the advantage that the pressure sensed by the downstream pipe 32' is less affected than in the FIG. 2 embodiment by flow disturbances induced by the pipe 32 immediately upstream of it. Somewhat greater accuracy can thus be expected.

Figure 5:
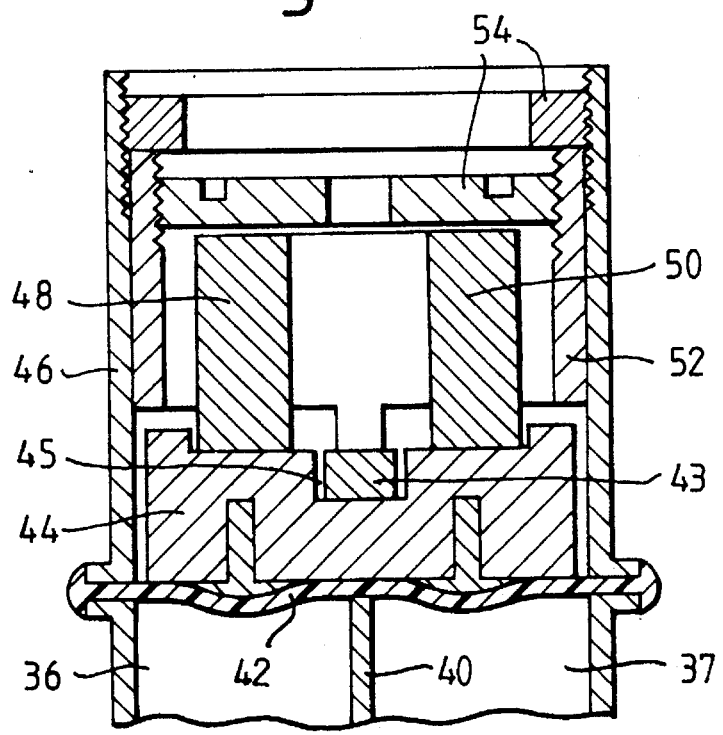
FIG. 5 is a section through a pressure transducer forming part of the flow meter of FIG. 2 or FIG. 4.

FIG. 5 shows the transducer 38 in more detail. The conduit 36, 37 are terminated by a pressure sensitive membrane 42, to which is attached a mass 44. The pressure fluctuations in the conduits 36, 37 are in antiphase (having been obtained from opposite ends of the pipe 32) and impart a rocking motion to the mass 44 through the membrane 42.

The mass 44 stabilized by loop 43 in groove 45 is disposed in a transducer housing 46 with sufficient clearance to permit the rocking movement, which is transmitted to two force or motion sensing elements 48, 50, in this case piezo-electric elements, which ape rigidly supported in the housing 46 by an inner cylinder 52 and locknuts 54. It will be appreciated that any structure which stably supports the elements 48, 50 will suffice, and that other than piezo-electric sensors may be used, for example, capacitive or magnetic.

Other forms of pressure-sensing device may be substituted for the pipes 32, 32' provided they will detect both hydrodynamic and static pressure. In particular there may be two intersecting pipes at the same axial station, similar to the pipes 32, 32' and disposed at 90° to each other with their respective ends connected to pairs of conduits 36, 37 as described.

Other modifications to the described embodiments will also be evident to the skilled man, and the invention herein contemplated extends to any novel feature or combination of features herein described and/or illustrated, whether or not falling within the scope of the appended claims.

I claim:

1. A method of measuring the mass flow rate of a flowing fluid comprising the steps of: directing the fluid flow in an initial axial direction, inducing a perturbation in the fluid flow by rotation of the fluid around the initial axial direction, subjecting the fluid flow to a Coriolis force to produce a phase shift in the perturbation, and measuring the phase shift.

2. A method of measuring the mass flow rate of a flowing fluid comprising the steps of: inducing a periodic pressure perturbation in the fluid flow, subjecting the fluid to a Coriolis force to produce a phase shift in the perturbation, and measuring the phase shift.

3. A method of measuring the mass flow rate of a flowing fluid comprising the steps of: directing the fluid flow in an initial axial direction, inducing periodic perturbations by rotating the flowing fluid around the initial axial direction, creating a phase shift in the perturbations, measuring the phase shift in said perturbations, and calculating the mass flow rate of the flowing fluid as a function of the phase shift.

4. A method as in claim 3, further comprising the steps of selecting spaced apart stations in said fluid flow and measuring the phase shift between said stations.

5. An apparatus for measuring the mass flow rate of a fluid flowing in an axial direction, comprising: means for rotating the fluid around the axial flow direction so as to produce perturbations in the fluid flow, means for subjecting the rotating fluid to a Coriolis force, means for measuring a phase shift in the perturbations due to the Coriolis force, and means for determining the mass flow rate of the fluid flow as a function of the phase shift.

6. An apparatus for measuring the mass flow rate of a flowing fluid, the fluid flowing in an initial axial direction, comprising: means for inducing a perturbation in the fluid flow by rotating the fluid around the initial axial flow direction, means for subjecting the fluid to a Coriolis force by generating a radial velocity component in the fluid flow, means for measuring a phase shift in the perturbations due to the Coriolis force, whereby the phase shift is indicative of the mass flow rate.

7. An apparatus as claimed in claim 6, wherein the means for subjecting the fluid to a Coriolis force is a duct which diverges in the axial direction of the fluid flow.

8. An apparatus as claimed in claim 6, wherein upstream of the diverging duct is a swirl generator to produce said rotation and a convergent duct for producing periodic pressure perturbations in the fluid flow.

9. An apparatus as claimed in claim 6, wherein the means for measuring a phase shift comprises a plurality of pressure measuring elements spaced axially and/or circumferentially with respect to one another.

10. An apparatus as claimed in claim 9, wherein there are two pressure measuring elements disposed at 90° to each other and spaced axially along the direction of fluid flow.

11. An apparatus as claimed in claim 9, wherein said pressure measuring elements comprise means for sensing pressure fluctuations across a transverse axis of the fluid flow.

12. An apparatus as claimed in claim 11, wherein the pressure sensing means comprises a pipe extending transversely across and being open to the fluid flow, opposite ends of the pipe being connected to separate pressure transducer means so that the output of the separate transducer means is indicative of the frequency and phase of pressure fluctuations within the fluid flow.

13. A method as claimed in claim 1, wherein the perturbation is a periodic pressure perturbation.

14. A method as claimed in claim 1, comprising selecting spaced apart stations in said fluid flow and measuring the phase shift between said stations.

15. A method as claimed in claim 2, comprising selecting spaced apart stations in said fluid flow and measuring the phase shift between said stations.

16. An apparatus as claimed in claim 7, wherein upstream of the diverging duct is a swirl generator to produce said rotation and a convergent duct for producing periodic pressure perturbations in the fluid flow.

17. An apparatus as claimed in claim 7, wherein the means for measuring a phase shift comprises a plurality of pressure measuring elements spaced axially and/or circumferentially of the fluid flow.

18. An apparatus as claimed in claim 8, wherein the means for measuring a phase shift comprises a plurality of pressure measuring elements spaced axially and/or circumferentially with respect to one another.

19. An apparatus as claimed in claim 5, wherein the means for measuring a phase shift comprises a plurality of pressure measuring elements spaced axially along and/or circumferentially around the fluid flow.

20. An apparatus as claimed in claim 10, wherein said pressure measuring elements comprise means mounted transverse to the initial axial direction of the fluid flow for sensing pressure fluctuations across the fluid flow.

21. A method of measuring the mass flow rate of a flowing fluid comprising the steps of: directing the fluid flow in an initial axial direction, generating a swirl in the flow around the axial flow direction to produce a perturbation in the fluid, subjecting the fluid to a Coriolis force to produce a phase shift in the perturbation, and measuring the phase shift.

22. A method as in claim 21, further comprising the steps of selecting spaced apart stations in said fluid flow and measuring the phase shift between said stations.

23. A flow meter for measuring the mass flow rate of a fluid, the flow meter comprising:

a flow duct having a circular cross-section and an axial flow axis;

swirl generators mounted within the flow duct for swirling fluid around the axial flow axis so as to produce perturbations in the fluid flow;

a converging section downstream of the swirl generators, the converging section adapted to concentrate the swirling flow and enhance the perturbations, a diverging section downstream of the converging section, the diverging section adapted to produce a Coriolis force in the fluid flow and which results in a phase shift in the perturbations; and pressure sensors extending into the flow for measuring the phase shift in the perturbations.

24. An apparatus for measuring mass flow according to claim 23 wherein the pressure sensors detect static and hydrodynamic pressure.

25. An apparatus for measuring mass flow according to claim 24 wherein the pressure sensors are pressure collecting pipes.

26. An apparatus for measuring mass flow according to claim 25 wherein there are two pressure collecting pipes axially spaced and aligned 90° with respect to one another.

27. An apparatus for measuring mass flow according to claim 24 wherein the swirl generators comprise spaced radially extending vanes, the vanes being angled to the direction of the fluid flow.

* * * * *